United States Patent
Deng et al.

(10) Patent No.: US 10,035,487 B2
(45) Date of Patent: Jul. 31, 2018

(54) SIDE AIRBAG INCLUDING FORWARD FACING VENT

(71) Applicant: Ford Global Technologies, LLC, Dearborn, MI (US)

(72) Inventors: Zhibing Deng, Northville, MI (US); Deepak Patel, Canton, MI (US); Shekar Prabhakar Erasala, Northville, MI (US); Alberto Molina Bernal, Villa Guerrereo (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 204 days.

(21) Appl. No.: 15/151,719

(22) Filed: May 11, 2016

(65) Prior Publication Data
US 2017/0072899 A1    Mar. 16, 2017

Related U.S. Application Data (60) Provisional application No. 62/219,336, filed on Sep. 16, 2015.

(51) Int. Cl.
| | |
|---|---|
| *B60R 21/239* | (2006.01) |
| *B60R 21/231* | (2011.01) |
| *B60R 21/207* | (2006.01) |
| *B60R 21/237* | (2006.01) |

(Continued)

(52) U.S. Cl.
CPC .......... *B60R 21/239* (2013.01); *B60R 21/207* (2013.01); *B60R 21/237* (2013.01); *B60R 21/23138* (2013.01); *B60R 21/231* (2013.01); *B60R 2021/0006* (2013.01); *B60R 2021/0032* (2013.01); *B60R 2021/23146* (2013.01); *B60R 2021/23538* (2013.01)

(58) Field of Classification Search
CPC ........................... B60R 21/239; B60R 21/231
See application file for complete search history.

(56) References Cited

U.S. PATENT DOCUMENTS

| | | | |
|---|---|---|---|
| 5,536,038 A * | 7/1996 | Bollaert | B60R 21/23 280/730.2 |
| 6,457,741 B2 | 10/2002 | Seki et al. | |
| 6,932,386 B2 | 8/2005 | Ikeda et al. | |

(Continued)

FOREIGN PATENT DOCUMENTS

| | | | | |
|---|---|---|---|---|
| DE | 102016117126 A1 * | 3/2017 | ........... | B60R 21/207 |
| JP | 2012096781 A | 5/2012 | | |
| WO | WO -2015093421 A1 * | 6/2015 | ....... | B60R 21/23138 |

OTHER PUBLICATIONS

Kim et al. JP 2012-96781A English translation, ip.com, May 24, 2010 (Year: 2012).*

(Continued)

*Primary Examiner* — Karen Beck
(74) *Attorney, Agent, or Firm* — Frank A. MacKenzie; Bejin Bieneman PLC (57) ABSTRACT

An airbag includes a panel including a first lobe and a second lobe connected at a spine. The first lobe and the second lobe are affixed to each other along a seam. An inflation chamber is defined between the first lobe and the second lobe. The first lobe has a tab extending from and transverse to a perimeter of the first lobe. The tab is connected to the second lobe, and a vent is on the tab and in communication with the inflation chamber.

10 Claims, 8 Drawing Sheets

(51) Int. Cl.
*B60R 21/00* (2006.01)
*B60R 21/235* (2006.01)

(56) References Cited

U.S. PATENT DOCUMENTS

| | | | |
|---|---|---|---|
| 6,976,702 B2 | 12/2005 | Yokota et al. | |
| 7,240,918 B2 | 7/2007 | Yamada et al. | |
| 8,123,248 B2 | 2/2012 | Yamane | |
| 8,186,708 B2 | 5/2012 | Zhou et al. | |
| 8,282,122 B2 * | 10/2012 | Marable | B60R 21/231 280/729 |
| 8,414,023 B2 | 4/2013 | Naganawa et al. | |
| 8,727,375 B2 | 5/2014 | Suzuki | |
| 8,746,736 B2 * | 6/2014 | Mendez | B60R 21/239 280/736 |
| 9,145,102 B2 | 9/2015 | Fujiwara | |
| 9,327,673 B2 * | 5/2016 | Fukawatase | B60R 21/239 |
| 9,487,179 B2 * | 11/2016 | Takedomi | B60R 21/2334 |
| 9,834,168 B2 * | 12/2017 | Deng | B60R 21/239 |
| 2006/0012160 A1 * | 1/2006 | Johansson | B60R 21/231 280/743.1 |
| 2008/0106128 A1 | 5/2008 | Kashiwagi | |
| 2009/0140509 A1 * | 6/2009 | Johansson | B60R 21/231 280/730.1 |
| 2009/0224520 A1 | 9/2009 | Higuchi | |
| 2011/0109071 A1 | 5/2011 | Onda et al. | |
| 2011/0266782 A1 * | 11/2011 | Hallbauer | B60R 21/239 280/743.1 |
| 2013/0229002 A1 * | 9/2013 | Enders | B60R 21/201 280/728.2 |
| 2014/0151985 A1 * | 6/2014 | Hotta | B60R 21/207 280/730.2 |
| 2014/0265277 A1 | 9/2014 | Ilda et al. | |
| 2015/0061267 A1 | 3/2015 | Deng et al. | |
| 2015/0097359 A1 | 4/2015 | Rickenbach et al. | |
| 2015/0183393 A1 | 7/2015 | Kino et al. | |
| 2015/0183394 A1 | 7/2015 | Yuki et al. | |
| 2015/0321638 A1 * | 11/2015 | Sugimoto | B60R 21/23138 280/729 |
| 2017/0072899 A1 * | 3/2017 | Deng | B60R 21/239 |

OTHER PUBLICATIONS

Kim et al., Airbag in which vent hole is formed, May 24, 2012, JPO, JP 2012-096781 A, Machine translation of description.
Non-Final Office Action dated Jun. 26, 2017 for related matter U.S. Appl. No. 15/132,303 (19 pages).
GB Search Report 16005P; Appl. No. GB1615735.6 dated Mar. 15, 2017.
Notice of Allowance dated Oct. 18, 2017 re: U.S. Appl. No. 15/132,303.

* cited by examiner

SIDE AIRBAG INCLUDING FORWARD FACING VENT

CROSS-REFERENCE TO RELATED APPLICATIONS

The subject patent application claims priority to and all the benefits of U.S. Provisional Patent Application No. 62/219,336 filed on Sep. 16, 2015, which is herein incorporated by reference in its entirety.

BACKGROUND

Side airbags of a vehicle may be deployable between an occupant and a door of the vehicle. The side airbag may be supported by a seat back of the vehicle. Specifically, in an uninflated position, the side airbag may be folded behind upholstery of the seat back, and may extend through the upholstery when inflated to an inflated position.

The side airbags may include vents to provide desired impact absorbing characteristics of the side airbag. The location of the vents that provides for desired impact absorbing characteristics may be subject to competing design factors. Accordingly, there remains an opportunity to design an improved side airbag with desired venting.

DETAILED DESCRIPTION

With reference to the Figures, wherein like numerals indicate like parts throughout the several views, an airbag 10, 210 for a vehicle 12 includes a panel 14 including a first lobe 16 and a second lobe 18. The first lobe 16 and the second lobe 18 are connected at a spine 20 and are affixed to each other along a seam 22. An inflation chamber 24 is defined between the first lobe 16 and the second lobe 18. The first lobe 16 has a tab 26 extending from and transverse to a perimeter P1 of the first lobe 16. The tab 26 is connected to the second lobe 18. A vent 30 on the tab 26 is in communication with the inflation chamber 24.

Since the vent 30 is on the tab 26, instead of at the seam 22, the shape of the vent 30 is maintained when the airbag 10, 210 is inflated during a vehicle 12 impact, as set forth further below. In addition, the location of the vent 30 on the tab 26 allows for design of the vent 30 in any one of a variety of shapes. In addition, the designed location of the vent 30 may be easily moved along two axes X, Y, e.g., a horizontal axis and a vertical axis. Thus, the shape of the vent 30 and the location of the vent 30 along the two axes X, Y may be optimized to encourage proper venting and to minimize blockage of the vent 30 during impact of the vehicle 12 and inflation of the airbag 10, 210.

Figure 1:
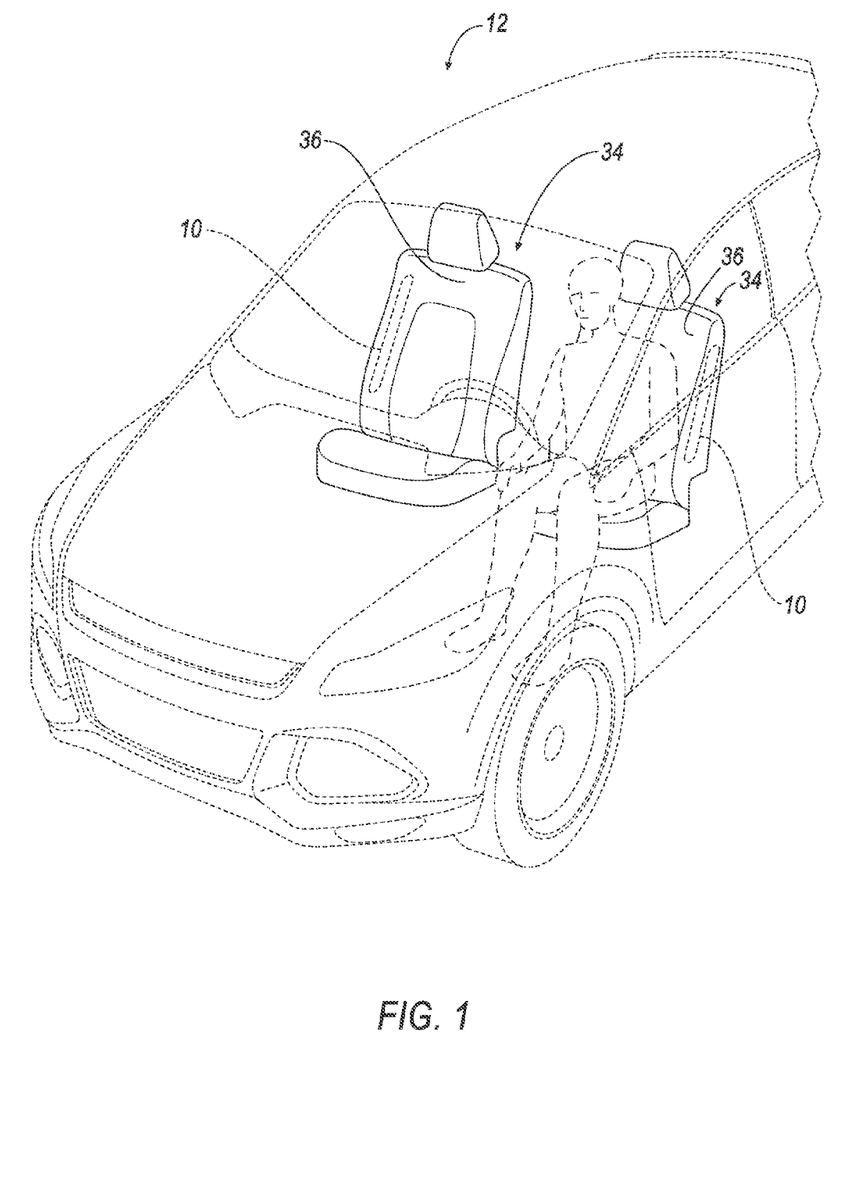
FIG. 1 is a perspective view of a vehicle with two side airbags shown in hidden lines in an uninflated position.
Figure 2:
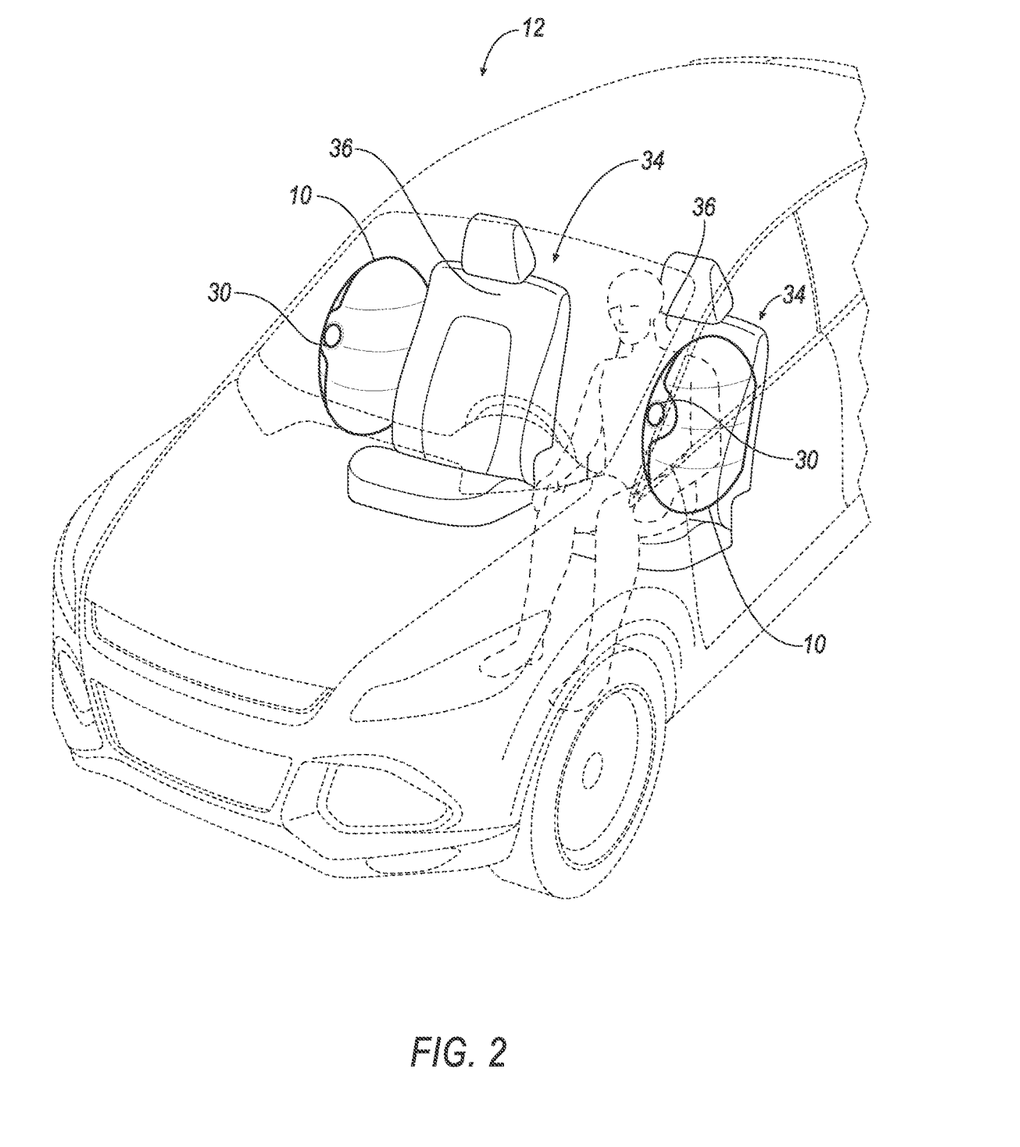
FIG. 2 is a perspective view of the vehicle with the side airbags in an inflated position.

With reference to FIGS. 1 and 2, a seat back assembly 34 may include the airbag 10. Similarly, the seat back assembly 34 may include a second embodiment of the airbag 210, described further below. The seat back assembly 34 includes a seat back 36, and the airbag 10, 210 is supported by the seat back 36. For example, the seat back 36 may include a frame (not numbered) and the airbag 10, 210 may be mounted to the frame. The airbag 10, 210 may be oriented relative to the seat back 36 with the spine 20 facing the seat back 36 and with the first lobe 16 and the second lobe 18 extending from the spine 20 in a direction away from the seat back 36 when inflated.

The airbag 10, 210 is inflatable from an uninflated position, as shown in FIG. 1, to an inflated position, as shown in FIG. 2. With reference to FIG. 1, in the uninflated position, the airbag 10, 210 may be folded in the seat back 36, e.g., behind upholstery such as a side bolster of the seat back 36. With reference to FIG. 2, when the airbag 10, 210 is inflated during a vehicle 12 impact, the airbag 10, 210 breaks through the upholstery and extends between an occupant and a door of the vehicle 12 to absorb impact energy between the occupant and the door.

The first lobe 16 and the second lobe 18 may be integral with each other at the spine 20, i.e., formed together simultaneously as a single continuous unit. For example, the panel 14, 214 may be a one-piece panel, e.g. a single, continuous piece of fabric, forming both the first lobe 16 and the second lobe 18. Alternatively, the first lobe 16 and the second lobe 18 may be formed separately and subsequently connected at the spine 20, e.g., by stitching, adhesive, fusing, etc.

Figure 3:
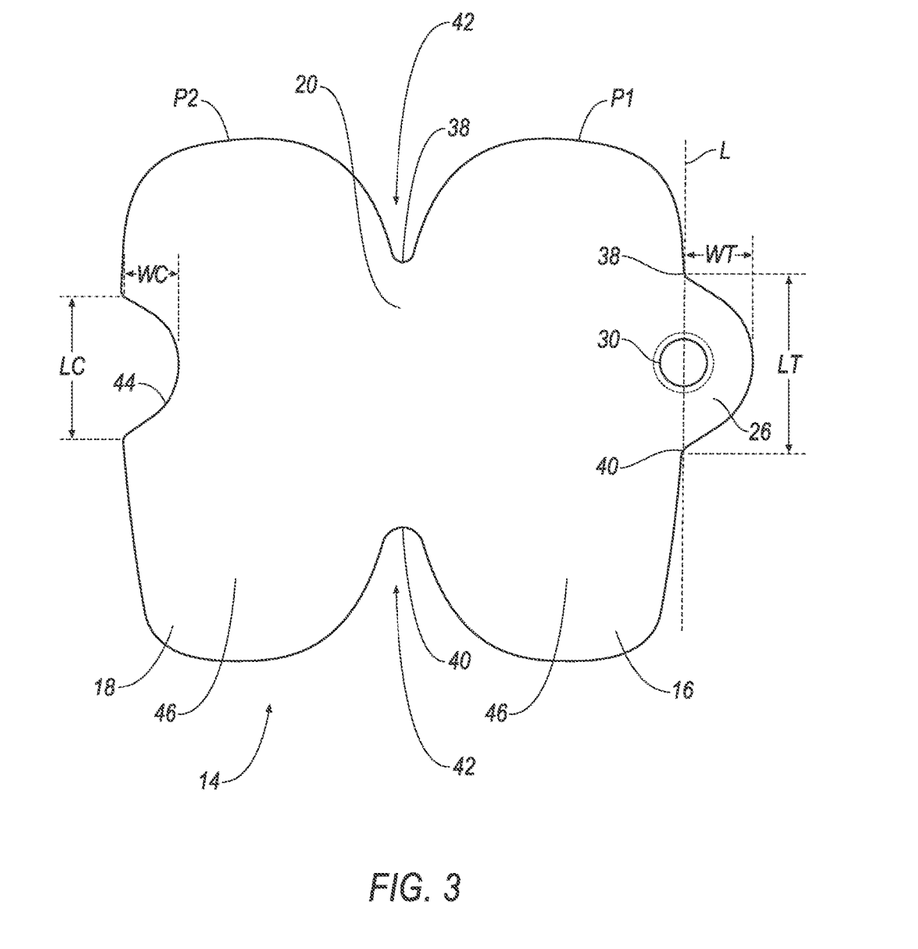
FIG. 3 is a front view of a panel of the side airbag in an unfolded position.
Figure 6:
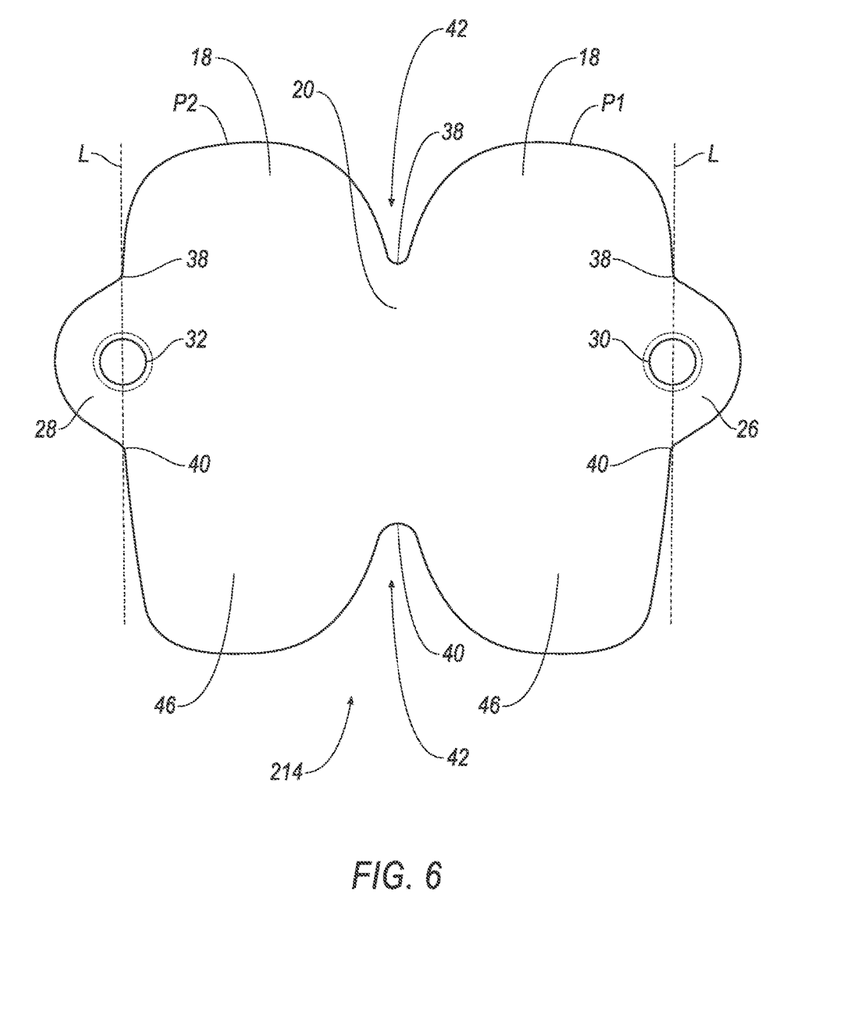
FIG. 6 is a front view of a panel of a second embodiment of the airbag in an unfolded position.

The spine 20 may extend from a first end 38 to a second end 40. When mounted to the seat back 36, the first end 38 and the second end 40 may be vertically spaced from each other. With reference to FIGS. 3 and 6, the panel 14, 214 may include a notch 42 between the first lobe 16 and the second lobe 18 at the first end 38 of the spine 20 and may include another notch 42 between the first lobe 16 and the second lobe 18 at the second end 40 of the spine 20. The notches 42 give the panel 14, 214 a butterfly shape.

Figure 4:
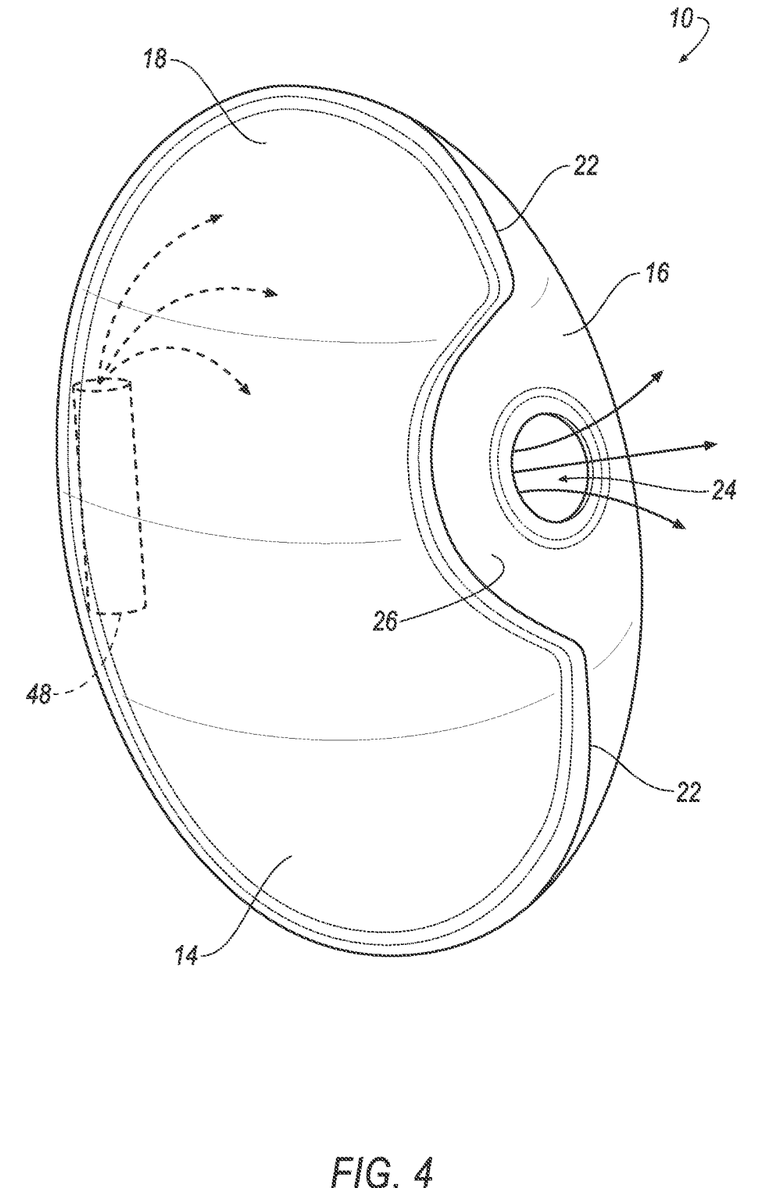
FIG. 4 is perspective view of the side airbag in the inflated position.
Figure 5:
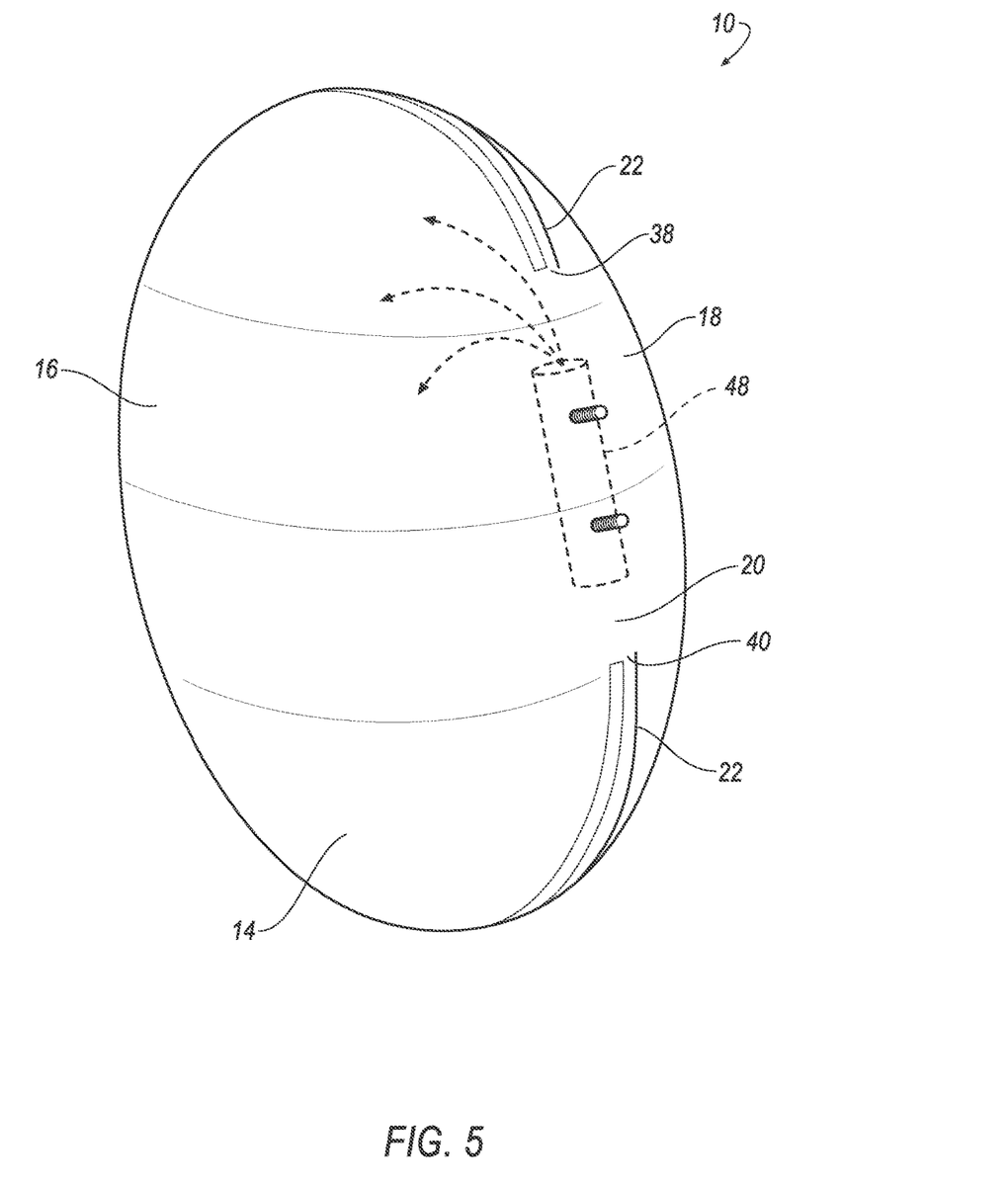
FIG. 5 is a rear view of the side airbag in the inflated position.
Figure 7:
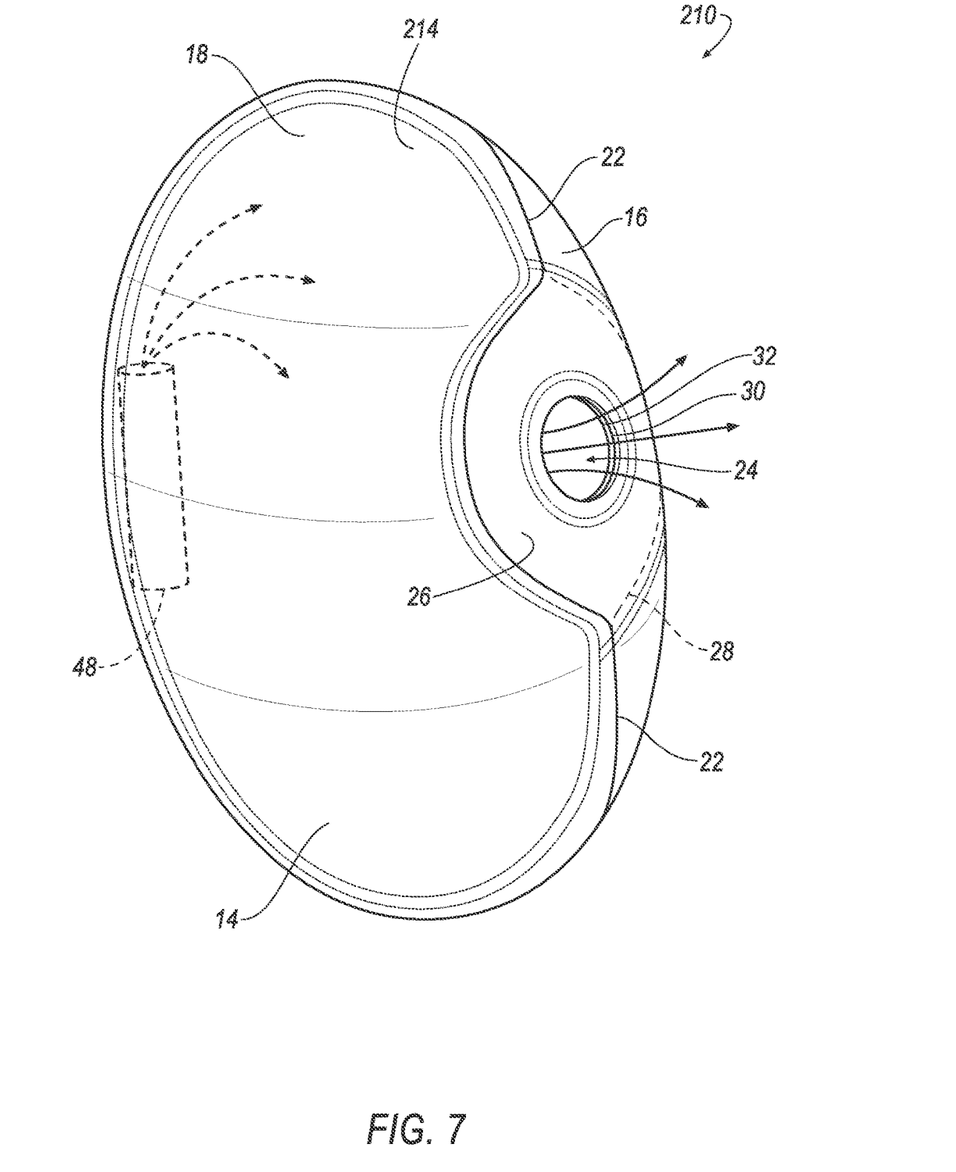
FIG. 7 is a perspective view of the second embodiment of the side airbag in the inflated position.

The first lobe 16 has the perimeter P1 and the second lobe 18 has a perimeter P2. As shown in FIGS. 4, 5, and 7, the perimeter P1 of the first lobe 16 and the perimeter P2 of the second lobe 18 overlap at the seam 22. The seam 22 extends from the first end 38 to the second end 40 of the spine 20. The seam 22 may be continuous from the first end 38 to the second end 40, i.e., may be sealed from the first end 38 to the second end 40. The panel 14, 214 may be folded about the spine 20 with the first lobe 16 and the second lobe 18 overlapping, and the first lobe 16 and the second lobe 18 may subsequently be connected along the seam 22. The panel 14, 214 may be folded about the spine 20, and may be additionally folded, when stored in the seat back 36 in the uninflated position.

The first lobe 16 and the second lobe 18 may be stitched to each other along seam 22. Alternatively, or in addition, the first lobe 16 and the second lobe 18 may be connected along the seam 22 in any suitable fashion, e.g., adhesive, fusing, welding, etc. The seam 22 may be sealed to prevent gas flow across the seam 22, i.e., to prevent gas flow from an inflation chamber 24 defined by the first lobe 16 and the second lobe 18.

The panel 14, 214 may be formed of any suitable type of material, e.g., from a woven polymer. For example, the panel 14, 214 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

The first embodiment of the airbag 10 is shown in FIGS. 3-5, and the second embodiment of the airbag 210 is shown in FIGS. 6-7. Common numerals are used to identify common features in the embodiments. As set forth further below, the first embodiment of the airbag 10 includes a cutout 44 on the second lobe 18 and the tab 26 on the first lobe 16 that overlaps the cutout 44. The second embodiment of the airbag 210 includes a tab 28 on the second lobe 18 aligned with the tab 26 on the first lobe 16.

With respect to the first embodiment of the airbag 10 shown in FIGS. 3-6, the first lobe 16 and the second lobe 18 are unsymmetrical about the spine 20, i.e., the first lobe 16 includes the tab 26 and the second lobe 18 includes the cutout 44. Specifically, the first lobe 16 includes a main portion 46 and the tab 26 extends from the main portion 46. The second lobe 18 includes a main portion 46 and the cutout 44 extends into the main portion 46. More specifically, the perimeter P1 of the first lobe 16 extends around the main portion 46 of the first lobe 16 and the tab 26 extends from the perimeter P1. The perimeter P2 of the second lobe 18 extends around the main portion 46 of the second lobe 18 and the cutout 44 extends into the perimeter P2.

As shown in FIG. 4, the tab 26 extends across the cutout 44. FIG. 3 shows the panel 14 before attachment of the first lobe 16 and the second lobe 18, and FIG. 4 shows the tab 26 connected to the second lobe 18 at the cutout 44 after the perimeter P1 of the main portion 46 of the first lobe 16 is connected to the perimeter P2 of the main portion 46 of the second lobe 18.

The tab 26 may have a shape corresponding to a shape of the cutout 44. For example, the tab 26 and the cutout 44 are arcuate in the Figures. Alternatively, the tab 26 and the cutout 44 may have any suitable shape, and may have the same shape or different shapes, such as, but not limited to, a rectangular shape.

The tab 26 is larger than the cutout 44 so that the tab 26 covers the cutout 44 when the first lobe 16 and the second lobe 18 are assembled together. For example, as shown in FIGS. 3 and 6, the length LT of the tab 26 is greater than the length LC of the cutout 44. Similarly, the width WT of the tab is greater than the width WC of the cutout 44.

The tab 26 is connected to the second lobe 18 at the cutout 44. Specifically, the tab 26 is connected to the second lobe 18 along the cutout 44. With reference to FIG. 4, the second lobe 18 is connected to the first lobe 16 along the seam 22. FIG. 3 shows the airbag 10 in an uninflated and unfolded position, and FIGS. 5 and 6 show the airbag 10 in an inflated position. The seam 22 extends along the perimeter P1 of the main portion 46 and along the tab 26 of the first lobe 16, and along a perimeter P2 and the cutout 44 of the second lobe 18. As shown in FIGS. 5 and 6, the seam 22 extends from the first end 38 to the second end 40 of the spine 20.

With reference to FIG. 4, the second lobe 18 defines the cutout 44 at the seam 22, and the tab 26 of the first lobe 16 is at the seam 22. The tab 26 covers the cutout 44.

The panel 14 may folded along the line L of the first lobe 16 in the uninflated position. For example, the panel 14 may be subsequently folded further to the position shown in FIG. 1.

With continued reference to FIG. 3, the tab 26 extends from a first end 38 to a second end 40. Specifically, the tab 26 extends from the perimeter P1 of the main portion 46 at the first end 38 of the tab 26 and at the second end 40 of the tab 26. As shown in the Figures, the first end 38 of the tab 26 and the second end 40 of the tab 26 extend transversely to the perimeter P1 of the main portion 46. The first end 38 and the second end 40 of the tab 26 may extend from the perimeter P1 of the main portion 46 at an arced transition, as shown in the Figures. Alternatively, the first end 38 and the second end 40 of the tab 26 may extend from the perimeter P1 of the main portion 46 at an angle. The tab 26 may be directly attached to the main portion 46 at the perimeter P1, or alternatively, may be attached to the main portion 46 at a position spaced from the perimeter P1 and may extend across the perimeter P1 to extend outwardly from the perimeter P1.

With continued reference to FIG. 3, the vent 30 may extend at least partially across a portion of the main portion 46, as shown in the Figures. In other words, the vent 30 may straddle the tab 26 and the main portion 46. Alternatively, the vent 30 may be located entirely on the tab 26.

The vent 30 may be disposed along a line L extending through the first end 38 and the second end 40. With reference to FIG. 3, the vent 30 may be disposed along a line L extending through the first end 38 and the second end 40 of the tab 26. The vent 30 may be centered on the line L of the first lobe 16, or alternatively may be offset, i.e., un-centered, relative to the line L of the first lobe 16.

With reference to the second embodiment of the airbag 210 shown in FIGS. 6-7, the second lobe 18 may include the tab 28. The tab 28 extends from the main portion 46 of the second lobe 18. The tab 28 may be aligned with the tab 28 of the first lobe 16 along the perimeter P1. The first lobe 16 and the second lobe 18 may be mirror images of each other, i.e., may be symmetrical, or, alternatively, may have different shapes.

FIG. 6 shows the panel 214 before attachment of the first lobe 16 and the second lobe 18. FIG. 7 shows the tab 26 connected to the second lobe 18 and shows the tab 28 connected to the first lobe 16.

With reference to FIGS. 6-7, the tab 28 extends from a first end 38 to a second end 40. Specifically, the tab 28 extends from the perimeter P2 of the main portion 46 at the first end 38 of the tab 28 and at the second end 40 of the tab 28. The first end 38 of the tab 28 and the second end 40 of the tab 28 extend transversely to the perimeter P2 of the main portion 46. The first end 38 and the second end 40 of the tab 28 may extend from the perimeter P2 of the main portion 46 at an arced transition, as shown in the Figures. Alternatively, the first end 38 and the second end 40 of the tab 28 may extend from the perimeter P2 of the main portion 46 19 at an angle. The tab 28 may be directly attached to the main portion 46 at the perimeter P2, or alternatively, may be attached to the main portion 46 at a position spaced from the perimeter P2 and may extend across the perimeter P2 to extend outwardly from the perimeter P2.

With reference to FIGS. 6-7, the tab 28 of the second lobe 18 may define a vent 32 in communication with the vent 30 of the first lobe 16. Specifically, the vent 30 and the vent 32 may overlap such that the inflation chamber 24 is in communication with atmosphere through the vent 30 and the vent 32.

As shown in FIG. 6, the vent 32 may extend at least partially across a portion of the main portion 46. In other words, the vent 32 may straddle the tab 28 and the main portion 46. Alternatively, the vent 32 may be located entirely on the tab 28.

With continued reference to FIG. 6, the vent 32 may be disposed along a line L extending through the first end 38 and the second end 40 of the tab 28. The vent 32 may be centered on the line L of the second lobe 18, or alternatively may be offset, i.e., un-centered, relative to the line L of the second lobe 18.

With continued reference to FIG. 6, the tab 26 and the tab 28 may have identical shapes and sizes. Alternatively, the tab 26 and the tab 28 may have any suitable shape, and may have the same shape or different shapes.

With reference to FIG. 7, the tab 26 of the first lobe 16 is connected to the second lobe 18 and the tab 28 of the second lobe 18 is connected to the first lobe 16. Specifically, the seam 22 may extend along the tab 26 and the tab 28. The seam 22 extends along the perimeters P1, P2 of the main portions 46, along the tab 26 of the first lobe 16, and along the tab 28 of the second lobe 18.

The panel 214 may folded along the line L of the first lobe 16 in the uninflated position, and the tab 28 may be folded along the line L of the second lobe 18. For example, the panel 214 may be subsequently folded further to the position shown in FIG. 1.

The tab 26 and the tab 28 may be integrally formed with the main portion 46 and the main portion 46, respectively, i.e., formed simultaneously as a single continuous unit. Alternatively, the tab 26 and the main portion 46 may be formed separately and subsequently attached together, and/or the tab 28 may be formed separately and subsequently attached together.

As best shown in FIG. 2, the vent 30, 32 is forward facing in the inflated position. In other words, the vehicle 12 extends along a longitudinal axis A, when the airbag 10, 210 is in the inflated position, the vent 30, 32 faces in a vehicle 12-forward direction along the longitudinal axis A. Specifically, with continued reference to FIG. 2, the vent 30, 32 faces an instrument panel of the vehicle 12 between the occupant and the door in the inflated position. As shown in FIGS. 4 and 7, the vent 30, 32 is spaced from the seam 22.

The vent 30, 32 may be reinforced to assist in maintaining the shape and integrity of the vent 30, 32 during inflation of the airbag 10, 210. For example, the vent 30, 32 may include a stitch around the vent 30, 32, as shown in the Figures. As one example, in the second embodiment, the tab 26 and the tab 28 may be connected to each other, e.g., stitched, around the vents 30, 32 such that the vents 30, 32 operate as a single vent. Alternatively, or in addition, the vent 30, 32 may include a patch reinforcement (not shown) connected to the tab 26, 28 around the vent 30, 32. The vent 30, 32 may be circular, as shown in the Figures. Alternatively, the vent 30, 32 may be of any suitable shape.

The vent 30, 32 may include a break-away flap (not shown). For example, the flap may be configured to cover the vent 30, 32 to restrict or prevent gas flow through the vent 30, 32 at pressures in the inflation chamber 24 below a predetermined pressure. The flap may also be configured to open to allow gas flow through the vent 30, 32 at pressures in the inflation chamber 24 above a predetermined pressure. For example, the flap may include stitching configured to break in response to pressure in the inflation chamber 24 exceeding the predetermined pressure. As another example, the flap may include a tether configured to break or to lengthen in response to pressure in the inflation chamber 24 exceeding the predetermined pressure.

As shown in FIGS. 4 and 6, the vent 30, 32 allows gas to exit the airbag 10, 210 in the inflated position. The vent 30, 32 may be tuned to allow suitable venting of the airbag 10, 210 to provide desired impact absorbing characteristics of the airbag 10, 210. Specifically, tunable parameters of the vent 30, 32 include the size of the vent 30, 32, the shape of the vent 30, 32, and the location of the vent 30, 32 along the two axes X, Y. The designed size and shape of the vent 30, 32 may be varied, and the size and shape of the vent 30, 32 is maintained when the airbag 10, 210 is in the inflated position.

The airbag 10, 210 may include an inflator 48 in communication with the inflation chamber 24. The inflator 48 may be disposed in the inflation chamber 24, as shown in FIGS. 4, 5, and 7, or may be disposed exterior to the inflation chamber 24.

The inflator 48 is in communication with the inflation chamber 24 to expand the inflation chamber 24 with an inflation medium, such as a gas. The inflator 48 may be, for example, a pyrotechnic inflator 48 that uses a chemical reaction to drive inflation medium to the inflation chamber 24. The inflator 48 may be of any suitable type, for example, a cold-gas inflator, a hybrid inflator, etc.

In an exemplary progression of the assembly of the airbag 10 of the first embodiment, the first lobe 16 and the second lobe 18 may be folded about the spine 20, and tab 26 may be disposed over the cutout 44 and stitched to the second lobe 18 along the cutout 44. Before, during, or after this step, the perimeter P1 of the main portion 46 of the first lobe 16 is stitched to the perimeter P2 of the second lobe 18. The inflator 48 may be disposed between the first lobe 16 and the second lobe 18 before or after the perimeter P1 of the main portion 46 of the first lobe 16 is stitched to the perimeter P2 of the main portion 46 second lobe 18. The second embodiment of the airbag 210 may be assembled in a similar progression.

Figure 8:
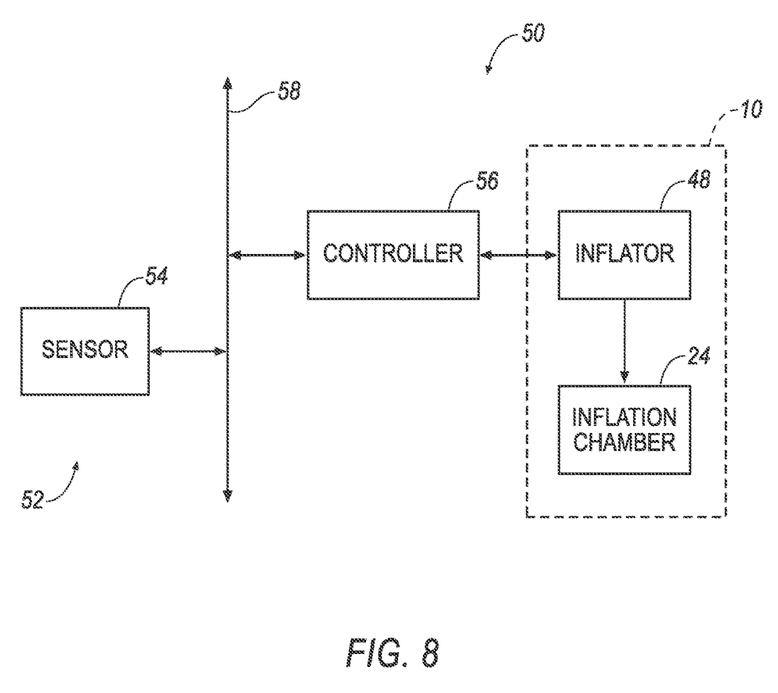
FIG. 8 is a schematic of an airbag system.

The airbag 10, 210 may be a component of an airbag system 50, i.e., a passive restraint system, which is shown schematically in FIG. 8. The airbag system 50 includes an impact sensing system 52, which may include at least one impact sensor 54 for sensing impact of the vehicle 12. The impact sensor 54 is the only component of the impact sensing system 52 shown in FIG. 8, however, it should be appreciated that the impact sensing system 52 may include additional components not shown in FIG. 13.

The airbag system 50 may include a controller 56. The controller 56 and the sensor 54 may be connected to a communication bus 58, such as a controller 56 area network (CAN) bus, of the vehicle 12. The controller 56 may use information from the communication bus 58 to control the activation of the inflator 48. The inflator 48 may be connected to the controller 56, as shown in FIG. 13, or may be connected directly to the communication bus 58.

The controller 56 may be in communication with the sensor 54 and the inflator 48, directly or through the communication bus, for activating the inflator 48, e.g., for providing an impulse to a pyrotechnic charge of the inflator 48, when the sensor 54 senses an impact of the vehicle 12. Alternatively or additionally to sensing impact, the impact sensing system 52 may be configured to sense impact prior to impact, i.e., pre-impact sensing. The sensor 54 may be of any suitable type, e.g., using radar, lidar, and/or a vision system. The vision system may include one or more cameras, CCD image sensors, and/or CMOS image sensor, etc.

The controller 56 may be a microprocessor-based controller 56. The sensor 54 is in communication with the controller 56 to communicate data to the controller 56. Based on the data communicated by the sensor, the controller 56 instructs the inflator 48 to activate.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag comprising:
   a panel including a first lobe and a second lobe integral with each other at a spine and connected to each other along a seam;
   an inflation chamber defined between the first lobe and the second lobe;
   the first lobe having a tab extending from and transverse to a perimeter of the first lobe, the tab being connected to the second lobe;
   wherein the second lobe is connected to the first lobe along a seam extending along the perimeter of the first lobe and along the tab, and wherein the second lobe defines a cutout at the seam, the tab being connected to the second lobe along the cutout;
   wherein the tab and the cutout are both arcuate and have the same shape, and wherein the tab extends from the perimeter at an arced transition; and
   a vent on the tab in communication with the inflation chamber, wherein the vent is spaced from the seam.

2. The airbag as set forth in claim 1, wherein the spine has a top and a bottom, and the seam extends from the top to the bottom.

3. The airbag as set forth in claim 2, wherein the first lobe and the second lobe are stitched to each other along the seam.

4. The airbag as set forth in claim 1, wherein the tab includes a first end and a second end and extends from the perimeter of the first lobe at the first end and the second end, wherein the vent is disposed along a line extending through the first end and the second end.

5. The airbag as set forth in claim 4, wherein the tab is folded along the line in an uninflated position.

6. The airbag as set forth in claim 1, wherein the first lobe and the second lobe are stitched to each other along the seam.

7. The airbag as set forth in claim 1, wherein the tab is larger than the cutout.

8. The airbag as set forth in claim 1, wherein the tab of the first lobe is aligned with the tab of the second lobe along the perimeter of the first lobe.

9. The airbag as set forth in claim 1, wherein the vent is circular.

10. The airbag as set forth in claim 1 further comprising an inflator in communication with the inflation chamber.

* * * * *